United States Patent [19]

Rawson et al.

[11] Patent Number: 5,186,377
[45] Date of Patent: Feb. 16, 1993

[54] APPARATUS FOR STIFFENING A CIRCUIT BOARD

[75] Inventors: Linda B. Rawson; Donald W. Kuk, both of Madison, Ala.

[73] Assignee: Intergraph Corporation, Huntsville, Ala.

[21] Appl. No.: 693,005

[22] Filed: Apr. 29, 1991

[51] Int. Cl.⁵ .................. B23K 1/08; B23K 37/04
[52] U.S. Cl. .................. 228/37; 228/180.1; 361/399; 361/419; 269/903
[58] Field of Search ............... 228/37, 57, 180.1; 248/317, 201; 428/600, 598; 361/412, 399, 417, 419; 269/49, 903

[56] References Cited

U.S. PATENT DOCUMENTS

| | | | |
|---|---|---|---|
| 2,746,062 | 5/1956 | Waltz | 269/49 |
| 3,604,609 | 9/1971 | Walls | 228/19 |
| 3,729,810 | 5/1973 | Piechocki | 228/214 |
| 4,175,734 | 11/1979 | Williams | 269/49 |
| 4,411,054 | 10/1983 | Zeilenga | 269/49 |
| 4,588,177 | 5/1986 | White | 269/903 |
| 4,595,185 | 6/1986 | Kitagawa | 269/903 |
| 4,602,730 | 7/1986 | Murakami et al. | 228/37 |
| 4,769,083 | 9/1988 | Tiritilli | 228/37 |
| 4,913,334 | 4/1990 | Kondo | 228/57 |

FOREIGN PATENT DOCUMENTS 1-271060  10/1989  Japan ..................... 228/37

OTHER PUBLICATIONS

IBM Tech. Dis. Bull. "Universal Wave Soldering Support Bridge", Exum. vol. 26, No. 5 Oct. 1983, p. 1983.

Primary Examiner—Kurt C. Rowan
Assistant Examiner—Jeanne M. Elpel
Attorney, Agent, or Firm—Cushman, Darby & Cushman

[57] ABSTRACT

An apparatus for stiffening a circuit board during soldering, assembly, and repair/rework, which includes an elongated crossmember having two opposing ends, an outer support leg extending downward from each crossmember end to form a bridge support with the crossmember and a central support leg extending downward from a central portion of the crossmember. A central portion of the circuit board is attached to the central support member to prevent the circuit board from softening and sagging when exposed to the heat from soldering.

19 Claims, 2 Drawing Sheets

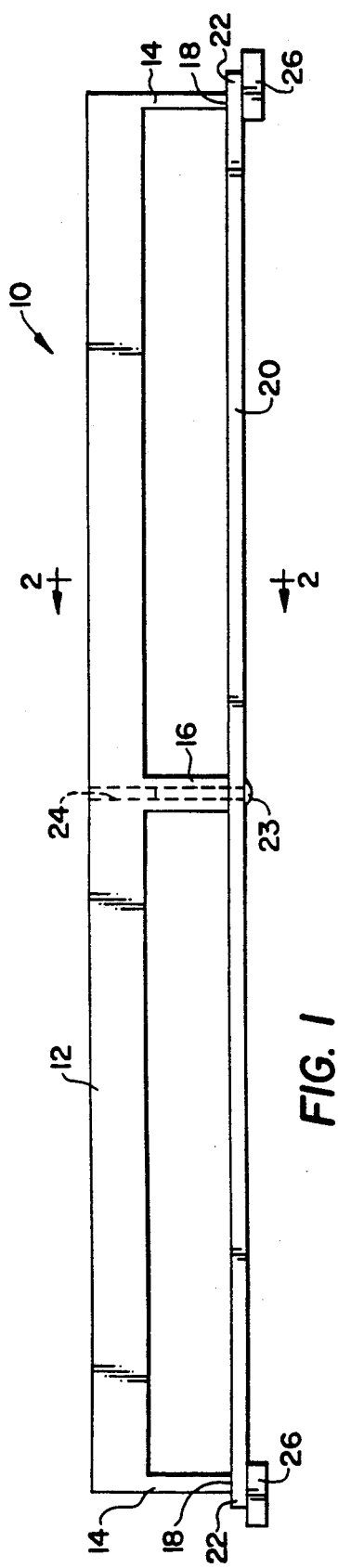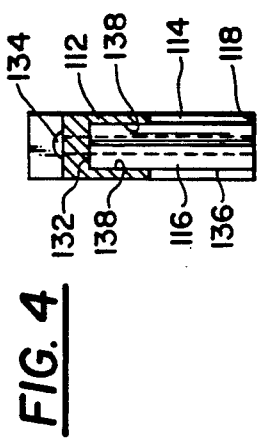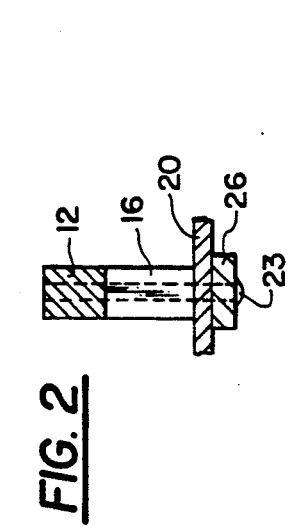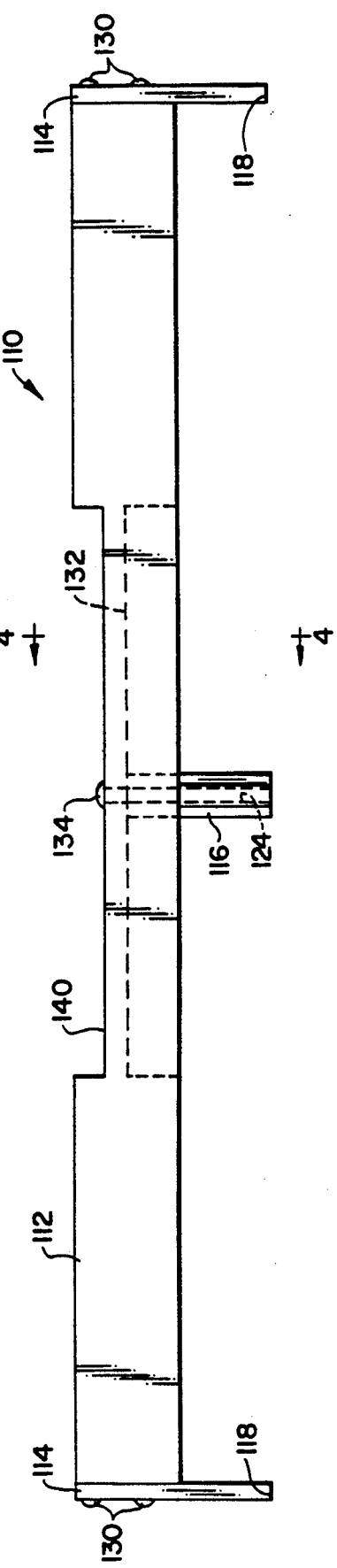

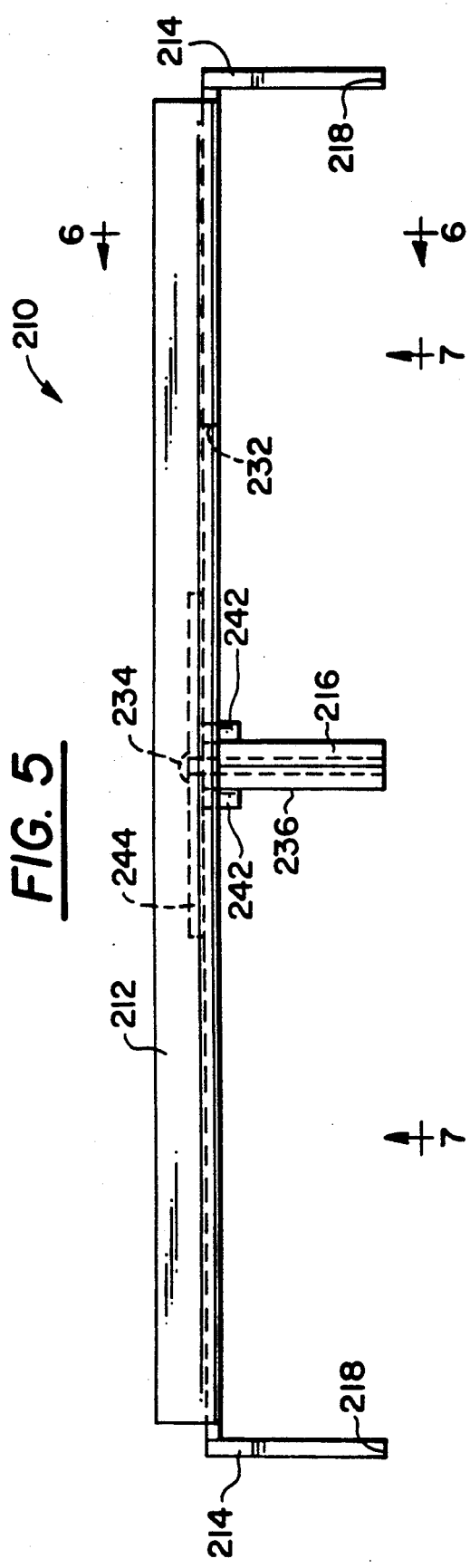
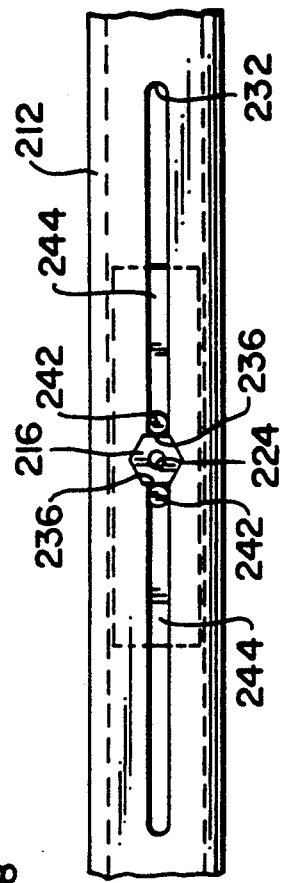
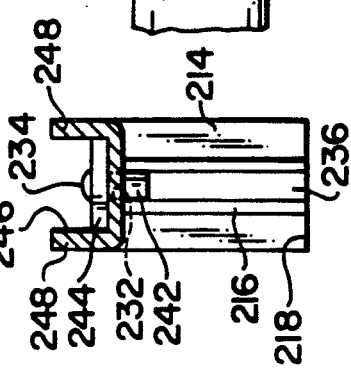

APPARATUS FOR STIFFENING A CIRCUIT BOARD

FIELD OF THE INVENTION

The present invention relates to an apparatus and method for stiffening a circuit board, particularly a printed circuit board during assembly, soldering, and repair and rework.

BACKGROUND OF THE INVENTION

In manufacturing printed circuit boards (PCBs), components are often placed on the board and then soldered all at once by exposing the bottom leads to a pool of molten solder as in a conventional wave soldering machine. Alternatively, components can be soldered in an infrared reflow machine or any other conventional soldering machine. These soldering machines typically have two parallel rails which support and carry the two outer boundaries of the PCB. However, the heat from soldering or from the molten solder pool can soften the PCB. The resulting sagging can cause the soldering to be uneven. At the extreme, the weight of the board and components can deform the board, making second side assembly impossible, or cause irreparable damage.

It is an object of the present invention to provide an apparatus and method for stiffening a PCB during soldering, assembly, and repair/rework to prevent or eliminate deformation of the PCB.

SUMMARY OF THE PRESENT INVENTION

The present invention includes two outer support legs extending in the same direction away from outer ends of an elongated crossmember and a central support leg between the two outer support legs, also extending from the crossmember in the same direction. The stiffening apparatus is attached to the PCB by fastening a central portion of the PCB to the central support leg with the two outer support legs resting on outer top surfaces of the PCB, respectively. In the preferred embodiment, the PCB is attached to the stiffening apparatus with a fastener passing through an aperture in the PCB and securing the PCB to the central support leg. The outer support legs contact the PCB in the regions of the PCB that are supported along the parallel rails of the soldering reflow machine. Thus, the stiffening apparatus is indirectly supported by the soldering reflow machine conveyor through the PCB, and in turn, supports the central portion of the PCB with the central support leg. This minimizes damage to the PCB due to heat softening and provides a flat surface on which to perform second side assembly operations. The stiffening device can then be removed and reused after the PCB has cooled sufficiently, either on a new board or the second side of the same board for second side assembly.

In an alternative embodiment, the center leg is adjustable to allow for different component positioning on various PCBs. Further, multiple stiffening apparatuses may be attached parallel to each other on larger boards in order to provide additional stiffening. Additionally, the stiffener is useful as an assembly handling tool and as a rest for the PCB when inverted.

BRIEF DESCRIPTION OF THE DRAWINGS

With the foregoing in mind, other objects, features and advantages of the present invention will become more apparent upon consideration of the following description and the appended claims with reference to the accompanying drawings, all of which form part of this specification, wherein like reference numerals designate corresponding parts in the various figures, in which:

FIG. 1 is a front elevational view of a first embodiment of the present invention attached to a printed circuit board;

FIG. 2 is a sectional view of the first embodiment along section line 2—2 in FIG. 1;

FIG. 3 is a front elevational view of a second embodiment of the present invention;

FIG. 4 is a sectional view of the second embodiment along section line 4—4 in FIG. 3;

FIG. 5 is a front elevational view of a third embodiment of the present invention;

FIG. 6 is a sectional view of the third embodiment along section line 6—6 in FIG. 5; and FIG. 7 is a sectional view of the third embodiment along section line 7—7 in FIG. 5.

DETAILED DESCRIPTION OF THE PREFERRED EMBODIMENTS

FIGS. 1 and 2 show a first embodiment of the stiffening apparatus 10 which includes an elongated crossmember 12, two outer support legs 14 extending downward from outer ends of the crossmember 12, respectively, and a central support leg 16 also extending downwardly from a central portion of the crossmember 12, all legs being the same length. In this embodiment, the stiffening apparatus is monolithically constructed from a single piece of material, which can be aluminum or any suitable material. Each outer support 14 has a contacting surface 18 which contacts a printed circuit board (PCB) 20 at an upper surface of outer boundary 22 thereof, when the stiffening apparatus 10 is positioned to be attached to the PCB 20. The PCB 20 is attached to the stiffening apparatus 10 by a screw 23 or alternative fastener passing through an aperture (not shown) in a central portion of the PCB 20, which engages a bore 24 in the central support leg 16. Bore 24 is threaded in the preferred embodiment, although it need not be.

After the stiffening apparatus 10 has been attached to the PCB 20, the PCB 20 can be placed on parallel guide rails 26 of a conventional soldering machine (not shown) with the direction of travel of the PCB 20 being perpendicular to a longitudinal plane of the stiffening apparatus 10. The outer support legs 14 and crossmember 12 are supported through the outer boundary 22 of the PCB 20 by the guide rails 26. The central portion of the PCB 20 is in turn, supported by the screw 23 engaging the central support leg 16, thereby preventing the central portion from sagging when exposed to the board softening heat from the soldering machine. Only one central support leg 16 is provided and attached to the PCB 20 in order to allow for differential expansion of the PCB 20 and the stiffening apparatus 10, owing to their unique thermal coefficients of expansion, thermal masses, thermal conductivity and elevated thermal ambience during soldering. The outer support legs 14 are not fixed to the PCB 20 but only contact an upper surface thereof. Therefore, the PCB 20 merely slides across the contact surfaces 18 of the outer support legs 14 as expansion and contraction occurs.

The stiffening apparatus 10 can be removed from the PCB 20 and reused when the PCB 20 has cooled sufficiently. At this point, the solidified solder added to the PCB 20 provides increased mechanical strength to the PCB 20.

For larger PCBs 20, a plurality of stiffening apparatuses 10 can be used, placed parallel to each other and disposed along the PCB 20 in a direction of travel. Further, when more than one stiffening apparatus 10 is used, the PCB 20 can be inverted to rest on the stiffening apparatuses 10 for inspection, further assembly, or repair/rework.

FIGS. 3 and 4 show a second embodiment wherein components similar in structure and function to components in the first embodiment use the same reference numeral preceded by a "1". Therefore, only the structure and function of different components will be described. Separate outer support legs 114 are attached to the crossmember 112 by screws 130. A hexagonal central support leg 116 is positioned in a shouldered longitudinal slot 132 and attached to the crossmember 112 by a screw 134. Flat side surfaces 136 of the hexagonal central support leg 116 engage corresponding surfaces 138 of the slot 132 to prevent the central support leg 116 from rotating. The central support leg 116 is longitudinally adjustable within the range of the slot 132 to accommodate various PCBs 20. The idea is to position support leg 116 away from any component to be soldered to the PCB. The head of the screw 134 is set in a recess 140 to maintain a flat upper surface of the stiffening apparatus 110, thereby providing a stable support if the PCB 20 is inverted to rest on the upper surfaces of a plurality of attached stiffening apparatuses 10. In alternative embodiments, central support leg 116 need not be hexagonal, but can have various cross-sections.

FIGS. 5-7 show a third embodiment wherein components having similar structure and function to components in the previous embodiments use the same reference numeral preceded by a "2". Again, only the structure and function of different components will be described. Crossmember 212 and outer support legs 214 are stamped from a single piece of metal, preferably steel or aluminum. Hexagonal central support 216 is prevented from rotating by two fixation pins 242 engaging opposing flat side surfaces 236. The two fixation pins 242 pass through the longitudinal slot 232 and are fixedly attached by any conventional means to a rectangular fixation member 244 positioned in a channel 246 formed by upturned sides 248 of the crossmember 212. The central support leg 216 is longitudinally adjustable within the range of the slot 232 and is attached to the crossmember 212 by screw 234 which passes through an aperture in the fixation member 244 and slot 232.

It should be realized that the stiffening apparatus can be constructed with any dimensions suited to a particular application. For instance, the length of crossmember 12 can be varied for differently sized PCBs. Also, the length of the legs can be varied. These variations can be obtained through different sizes of components or through adjustable components. For instance, the central support leg 16 can be shorter than the outer support legs 14 to impart a counter bow to the heat induced sag. Further, the various components can be constructed from any appropriate materials, including steel, aluminum and heat resistant plastics. The components can be plated, coated, or anodized as necessary for enhanced appearance and durability. Finally, alternative embodiments can comprise various features from the different embodiments.

While the invention has been described in accordance with what is presently conceived to be the most practical and preferred embodiment, it is to be understood that the invention is not to be limited to the disclosed embodiment but on the contrary, is intended to cover various modifications and equivalent arrangements included within the spirit and the scope of the appended claims, which scope is to be accorded the broadest interpretation of such claims so as to encompass all such equivalent structures.

I claim:

1. An apparatus for stiffening a circuit board during soldering comprising:
   an elongated crossmember including two opposing ends;
   two circuit board upper surface engaging means, one each extending away from each crossmember end, the two upper surface engaging means extending in the same direction to form a bridge support with the crossmember, each upper surface engaging means including a contacting surface at a distal end for resting on an upper surface of the circuit board to permit relative movement between the upper surface engaging means and the circuit board; and
   a central support leg extending away from a central portion of the crossmember between the two upper surface engaging means in the same direction as the two upper surface engaging means, the central support leg including means for attaching the central support leg to the circuit board to support a central portion of the circuit board, wherein the central support leg reduces deformation of the circuit board due to heat from the soldering.

2. An apparatus as in claim 1, wherein the means for attaching the central support leg to the circuit board comprises:
   a threaded fastener for engaging a bore in the central support leg and clamping the circuit board between a portion of the threaded fastener and the central support leg.

3. An apparatus as in claim 1, wherein the two upper surface engaging means and the crossmember are a single monolithic structure.

4. An apparatus as in claim 1, wherein the central support leg and the crossmember are a single monolithic structure.

5. An apparatus as in claim 1, wherein the two upper surface engaging means are separate components attached to the crossmember.

6. An apparatus as in claim 1, wherein the central support leg is a separate component attached to the crossmember.

7. An apparatus as in claim 1, wherein the two upper surface engaging means and the central support leg are all the same length.

8. An apparatus as in claim 1, wherein at least one of the group of the central support leg and the two upper surface engaging means has a different length than the others of the group.

9. An apparatus as in claim 1, and further comprising:
   means for longitudinally adjusting the position of the central support leg with respect to the two upper surface engaging means.

10. An apparatus as in claim 9, wherein the means for longitudinal adjustment comprises:
    an elongated slot in the crossmember;
    means for attaching the central support leg to the crossmember through the elongated slot, thereby allowing the central support leg to be positioned at different locations along a length of the slot.

11. An apparatus as in claim 10, and further comprising:
   means for preventing rotation of the central support leg.

12. An apparatus as in claim 11, wherein the means for preventing rotation comprises:
   at least one rotation preventing surface on the central support leg which engages at least one corresponding surface of the slot.

13. An apparatus as in claim 11, wherein the means for preventing rotation comprises:
   a pair of fixation pins attached to a fixation member, the fixation pins passing through the slot to fixedly engage at least one rotation preventing surface of the central support leg.

14. An apparatus as in claim 1, wherein the two upper surface engaging means rest on the upper surface of the circuit board and are not directly attached to the circuit board.

15. An apparatus for stiffening a circuit board during soldering comprising:
   an elongated crossmember including two opposing ends;
   two outer support legs, one each extending away from each crossmember end, the two outer support legs extending in the same direction to form a bridge support with the crossmember, each outer support leg including a contacting surface at a distal end for engaging the circuit board; and
   a central support leg extending away from a central portion of the crossmember between the two outer support legs in the same direction as the two outer support legs, the central support leg including means for attaching the central support leg to the circuit board to support a central portion of the circuit board;
   wherein the means for attaching the central support leg to the circuit board comprises a threaded fastener for engaging a bore in the central support leg and clamping the circuit board between a portion of the threaded fastener and the central support leg.

16. An apparatus for stiffening a circuit board during soldering comprising:
   an elongated crossmember including two opposing ends;
   two outer support legs, one each extending away from each crossmember end, the two outer support legs extending in the same direction to form a bridge support with the crossmember, each outer support leg including a contacting surface at a distal end for resting on the circuit board to permit relative movement between the outer support leg and the circuit board; and
   a central support leg extending away from a central portion of the crossmember between the two outer support legs in the same direction as the two outer support legs, the central support leg including means for attaching the central support leg to the circuit board to support a central portion of the circuit board;
   wherein the central support leg and the crossmember are a single monolithic structure.

17. An apparatus for stiffening a circuit board during soldering comprising:
   an elongated crossmember including two opposing ends;
   two outer support legs, one each extending away from each crossmember end, the two outer support legs extending in the same direction to form a bridge support with the crossmember, each outer support leg including a contacting surface at a distal end for engaging the circuit board; and
   a central support leg extending away from a central portion of the crossmember between the two outer support legs in the same direction as the two outer support legs, the central support leg including means for attaching the central support leg to the circuit board to support a central portion of the circuit board;
   wherein at least one support leg has a different length than the other support legs.

18. An apparatus for stiffening a circuit board during soldering comprising:
   an elongated crossmember including two opposing ends;
   two outer support legs, one each extending away from each crossmember end, the two outer support legs extending in the same direction to form a bridge support with the crossmember, each outer support leg including a contacting surface at a distal end for engaging the circuit board;
   a central support leg extending away from a central portion of the crossmember between the two outer support legs in the same direction as the two outer support legs, the central support leg including means for attaching the central support leg to the circuit board to support a central portion of the circuit board; and
   means for longitudinally adjusting the position of the central support leg with respect to the two outer support legs.

19. An apparatus for stiffening a circuit board during soldering comprising:
   an elongated crossmember including two opposing ends;
   two outer support legs, one each extending away from each crossmember end, the two outer support legs extending in the same direction to form a bridge support with the crossmember, each outer support leg including a contacting surface at a distal end for engaging the circuit board; and
   a central support leg extending away from a central portion of the crossmember between the two outer support legs in the same direction as the two outer support legs, the central support leg including means for attaching the central support leg to the circuit board to support a central portion of the circuit board;
   wherein the means for attaching the central support leg to the circuit board comprises a fastener for engaging a bore in the central support leg and clamping the circuit board between a portion of the fastener and the central support leg.

* * * * *